(12) United States Patent
Arai et al.

(10) Patent No.: US 11,624,391 B2
(45) Date of Patent: Apr. 11, 2023

(54) CONNECTION FASTENER

(71) Applicant: MAX CO., LTD., Tokyo (JP)

(72) Inventors: Toshimichi Arai, Tokyo (JP); Satoru Yoneyama, Tokyo (JP); Yasushi Yokochi, Tokyo (JP); Naoyuki Fukushima, Tokyo (JP)

(73) Assignee: MAX CO., LTD., Tokyo (JP)

( * ) Notice: Subject to any disclaimer, the term of this patent is extended or adjusted under 35 U.S.C. 154(b) by 535 days.

(21) Appl. No.: 16/728,085

(22) Filed: Dec. 27, 2019

(65) Prior Publication Data

US 2020/0208668 A1 Jul. 2, 2020

(30) Foreign Application Priority Data

Dec. 27, 2018 (JP) .............................. JP2018-244824

(51) Int. Cl.
*F16B 15/08* (2006.01)
*F16B 43/00* (2006.01)

(52) U.S. Cl.
CPC .............. *F16B 15/08* (2013.01); *F16B 43/00* (2013.01)

(58) Field of Classification Search
CPC .......... F16B 15/00; F16B 15/08; F16B 27/00; F16B 43/00; B25B 23/06; Y10S 411/92
USPC ................... 411/439, 442, 443, 444
See application file for complete search history.

(56) References Cited

U.S. PATENT DOCUMENTS

| | | | |
|---|---|---|---|
| 3,428,169 A | 2/1969 | Hilti | |
| 4,106,618 A | 8/1978 | Haytayan | |
| 4,167,229 A | 9/1979 | Keusch et al. | |
| 4,932,821 A * | 6/1990 | Steffen | F16B 15/08 411/443 |
| 5,046,396 A | 9/1991 | Pfister | |
| 5,069,340 A | 12/1991 | Ernst et al. | |
| 5,836,732 A * | 11/1998 | Gupta | F16B 15/08 411/443 |
| 5,865,311 A | 2/1999 | Hentges et al. | |
| 5,931,622 A * | 8/1999 | Gupta | F16B 15/08 411/443 |
| 6,135,278 A * | 10/2000 | Rohrmoser | F16B 15/08 411/443 |
| 6,814,231 B2 * | 11/2004 | Gupta | F16B 15/08 411/443 |
| 7,588,147 B2 * | 9/2009 | Del Hoyo | F16B 15/08 411/443 |
| 8,328,012 B2 * | 12/2012 | Miescher | F16B 15/08 411/443 |

(Continued)

FOREIGN PATENT DOCUMENTS

CN 1250137 A 4/2000
CN 1684885 A 10/2005
(Continued)

OTHER PUBLICATIONS

JP-Information offer 2018-244824 on Nov. 17, 2020 (4 pages).
(Continued)

*Primary Examiner* — Roberta S Delisle
(74) *Attorney, Agent, or Firm* — Weihrouch IP

(57) ABSTRACT

A connection fastener in which a plurality of fasteners for a driving tool are connected includes a connection band which detachably connects sleeves holding the fasteners one by one. A gap is formed between the sleeve and the fastener so as to face a toe side of the fastener.

11 Claims, 15 Drawing Sheets

(56) References Cited

U.S. PATENT DOCUMENTS

| | | | |
|---|---|---|---|
| 8,360,703 B2* | 1/2013 | Shelton | F16B 15/08 |
| | | | 411/443 |
| 8,556,073 B2* | 10/2013 | Liang | B65D 85/24 |
| | | | 411/443 |
| 2003/0136693 A1* | 7/2003 | Gupta | F16B 15/08 |
| | | | 206/343 |
| 2004/0118719 A1 | 6/2004 | Powers et al. | |
| 2004/0118720 A1 | 6/2004 | Powers et al. | |
| 2007/0074880 A1 | 4/2007 | Gaudron | |
| 2007/0278119 A1 | 12/2007 | Gaudron | |
| 2009/0053032 A1 | 2/2009 | Gaudron | |
| 2009/0120818 A1* | 5/2009 | Del Hoyo | B25C 1/184 |
| | | | 206/345 |
| 2011/0068029 A1* | 3/2011 | Teng | B25C 1/003 |
| | | | 206/347 |
| 2015/0014388 A1 | 1/2015 | Moriwaki et al. | |
| 2018/0017093 A1 | 1/2018 | Nakagawa et al. | |
| 2019/0301512 A1 | 10/2019 | Nakagawa et al. | |

FOREIGN PATENT DOCUMENTS

| | | |
|---|---|---|
| CN | 107620753 A | 1/2018 |
| DE | 1478783 A1 | 3/1969 |
| DE | 7639013 U1 | 10/1978 |
| DE | 19602789 A1 | 7/1997 |
| EP | 0401171 A2 | 12/1990 |
| EP | 2295821 A2 | 3/2011 |
| EP | 3269987 A1 | 1/2018 |
| JP | 57-001908 A | 1/1982 |
| JP | 4966971 B2 | 4/2012 |
| JP | 2015-013331 A | 1/2015 |
| JP | 2015-052331 A | 3/2015 |

OTHER PUBLICATIONS

The Extended European Search Report mailed in corresponding EP Patent Application No. 19219761.4 dated May 6, 2020 (9 pages).
European Office Action for application No. 19219761.4 dated Sep. 1, 2021 (6 pages).

* cited by examiner

CONNECTION FASTENER

CROSS-REFERENCE TO RELATED APPLICATIONS

This application is based on and claims priority under 35 USC 119 from Japanese Patent Application No. 2018-244824 filed on Dec. 27, 2018.

TECHNICAL FIELD

The present invention relates to a connection fastener in which a plurality of fasteners for a driving tool are connected.

BACKGROUND ART

A connection fastener in which a plurality of fasteners are connected by a connection band can be used for various types of driving tools because a large number of fasteners can be set together in a driving tool and continuously injected.

A connection band of such a connection fastener is generally provided with a detachable sleeve as described in Japanese Patent No. 4966971, for example, and holds the fastener with the sleeves one by one.

The inner surface of the sleeve of the connection band is formed in a cylindrical shape to hold the inserted fastener. Also, the outer shape of the sleeve is formed so as to be along the inside of the injection path so that the posture of the fastener can be kept vertical in the injection path when ejecting the fastener.

However, the inventors have found that, when a connection fastener of the related art as described above is used, the pulling-out strength may be lowered when a fastener is driven into a thin steel plate or the like. That is, when the fastener penetrates into a thin steel plate or the like, a burring shape is formed around it. This burring shape tries to grow as the fastener penetrates, but when the fastener penetrates to a certain extent, the connection band attached to the fastener abuts on the projecting tip of the burring shape and acts to press down the burring shape. When the burring shape is pressed down and crushed or spread, the burring shape is formed without adhering to the fastener, and thus the holding power of the fastener is reduced.

SUMMARY OF INVENTION

An aspect of the invention is based on the above discovery and an object thereof is to provide a connection fastener which can prevent a reduction in the pulling-out strength of a fastener when the fastener is driven into a thin steel plate or the like.

An embodiment of the present invention relates to a connection fastener in which a plurality of fasteners for a driving tool are connected, which includes:

a connection band which detachably connects sleeves holding the fasteners one by one, in which a gap is formed between the sleeve and the fastener so as to face a toe side of the fastener The invention is as described above and a gap is formed between the sleeve and the fastener so as to face the toe side of the fastener. According to such a configuration, when the fastener is driven into a thin steel plate or the like, the burring shape is formed so as to enter the gap, so that the growth of the burring shape is not hindered. Therefore, since the burring shape is formed in close contact with the fastener, the pulling-out strength of the driven fastener does not decrease (in other words, the pulling-out strength of the fastener is improved as compared with a case of the related art).

Further, since the shape of the sleeve of the related art can be used as it is, it does not affect the function of stabilizing the posture of the fastener in the injection path or the magazine. Therefore, it is possible to improve only the pulling-out strength of the fastener without deteriorating other functions due to the connection band and without changing the shape of the magazine and the injection path.

The gap is formed by forming a recess portion on an inner peripheral surface of the sleeve. With this configuration, when the fastener is driven and the sleeve is crushed, the toe side of the sleeve spreads easily outside, so the crushing load is reduced. By making the sleeve easier to be crushed as described above, the impact at the time of driving is absorbed and the deformation of the thin steel plate is suppressed, so the deformation of the burring shape is suppressed and the adhesion degree between the fastener and the burring shape can be increased.

The recess portion is formed in a cylindrical shape so as to surround a periphery of the fastener. With this configuration, the sleeve is easily crushed into a circular shape when the fastener is driven. When the sleeve is crushed into a circular shape, the sleeve acts as a washer, so it is possible to increase the holding power by the fastener.

The recess portion has a tapered shape which gradually expands as it extends toward the toe side. With this configuration, when a fastener is driven and the sleeve is crushed, the toe side of the sleeve is likely to spread outward, so the ease of crushing the sleeve is improved.

In the sleeve, an inner peripheral surface of an end portion opposite to an end portion where the gap is formed is in close contact with the fastener. With this configuration, the holding of the fastener by the sleeve can be further stabilized. In particular, it is possible to make the fastener difficult to be inclined in the injection path.

The sleeve is formed asymmetrically in a vertical direction. With this configuration, the loading direction when loading the connection fastener to the magazine is determined, so it can prevent the wrong mounting from being made upside down.

BRIEF DESCRIPTION OF DRAWINGS

FIG. 8A is a side view, FIG. 8B is a bottom view, FIG. 8C is a front view, FIG. 8D is a cross-sectional view taken along the line X-X, and FIG. 8E is a cross-sectional view of only the sleeve taken along the line X-X.

FIGS. 10A to 10C are views when a gap is provided on a head portion side and FIGS. 10D to 10F are views when no gap is provided on the head portion side.

FIG. 11A is a cross-sectional view of a connection fastener according to a modification example 1 taken along the line X-X, FIG. 11B is a cross-sectional view of only a sleeve according to the modification example 1 taken along the line X-X, FIG. 11C is a cross-sectional view of a connection fastener according to a modification example 2 taken along the line X-X, FIG. 11D is a cross-sectional view of only a sleeve according to the modification example 2 taken along the line X-X, FIG. 11E is a cross-sectional view of a connection fastener according to a modification example 3 taken along the line X-X, FIG. 11F is a cross-sectional view of only a sleeve according to the modification example 3 taken along the line X-X, FIG. 11g is a cross-sectional view of a connection fastener according to a modification example 4 taken along the line X-X, and FIG. 11H is a cross-sectional view of only a sleeve according to the modification example 4 taken along the line X-X.

FIG. 12A is a cross-sectional view of a connection fastener according to a modification example 5 taken along the line X-X, FIG. 12B is a cross-sectional view of only a sleeve according to the modification example 5 taken along the line X-X, FIG. 12C is a bottom view of the connection fastener according to the modification example 5, FIG. 12D is a cross-sectional view of a connection fastener according to a modification example 6 taken along the line X-X, FIG. 12E is a cross-sectional view of only a sleeve according to the modification example 6 taken along the line X-X, FIG. 12F is a bottom view of the connection fastener according to the modification example 6, FIG. 12G is a cross-sectional view of a connection fastener according to a modification example 7 taken along the line X-X, FIG. 12H is a cross-sectional view of only a sleeve according to the modification example 7 taken along the line X-X, FIG. 12I is a bottom view of the connection fastener according to the modification example 7, FIG. 12J is a cross-sectional view of a connection fastener according to a modification example 8 taken along the line X-X, FIG. 12K is a cross-sectional view of only a sleeve according to the modification example 8 taken along the line X-X, and FIG. 12L is a bottom view of the connection fastener according to the modification example 8.

FIG. 13A is a cross-sectional view of a connection fastener according to a modification example 9 taken along the X-X line and FIG. 13B is a cross-sectional view of only a sleeve according to the modification example 9 taken along the X-X line.

FIG. 14A is a cross-sectional view of a connection fastener of the related art taken along the line X-X and FIG. 14B is a cross-sectional view of only a sleeve of the related art taken along the line X-X.

FIGS. 15A to 15F are views sequentially illustrating how the fastener penetrates into the driving target material.

DESCRIPTION OF EMBODIMENTS

Embodiments of the invention will be described with reference to the drawings.

Figure 1:
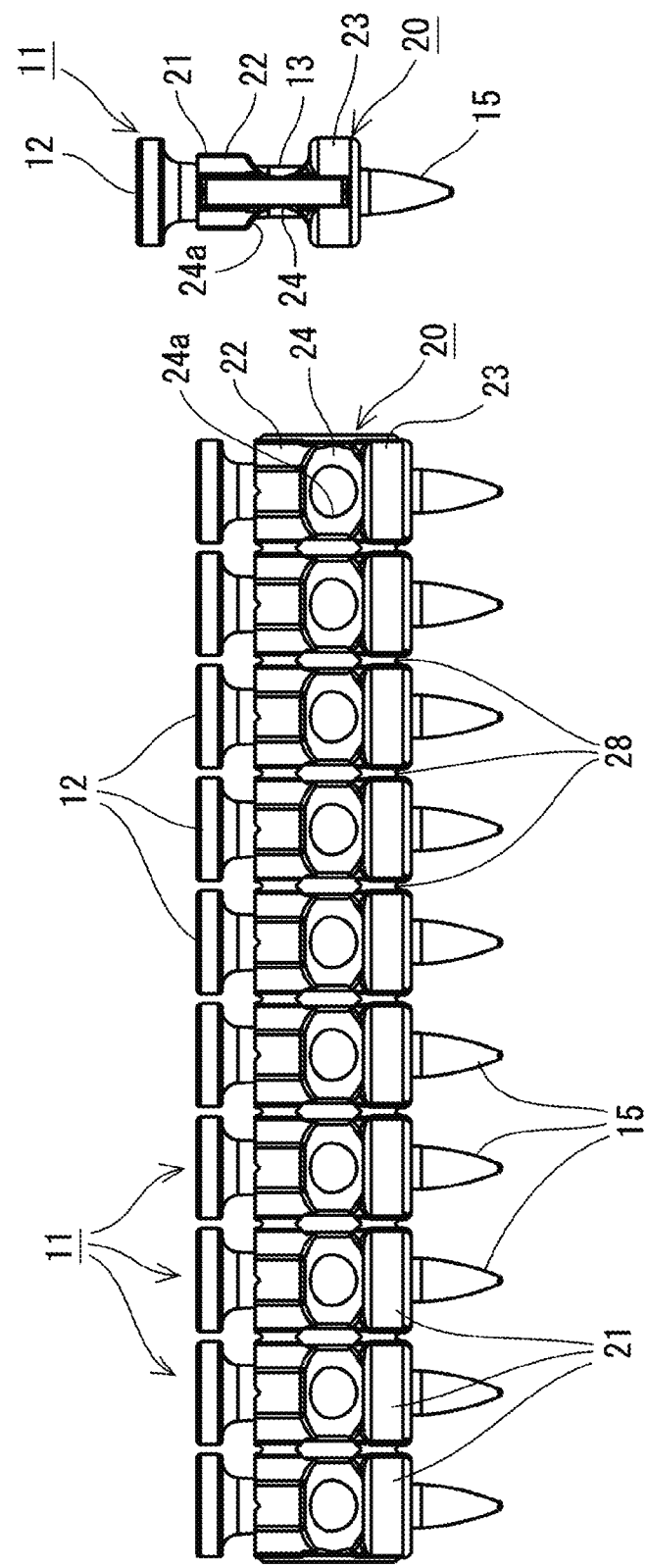
FIG. 1A is a side view of a connection fastener and FIG. 1B is a front view.

As illustrated in FIGS. 1A and 1B, a connection fastener 10 according to the embodiment is formed by connecting a plurality of fasteners 11 for a driving tool 30. The connection fastener 10 includes the fastener 11 and a connection band 20.

As illustrated in FIGS. 1A and 1B and FIGS. 8A to 8E, the fastener 11 is a pin provided with a head portion 12. The fastener 11 includes a shaft portion 13 having a substantially cylindrical shape further on the toe side than the head portion 12 and includes a tip end portion 15 having a substantially conical shape (cannonball shape) further on the toe side than the shaft portion 13.

The connection band 20 is a member made of synthetic resin to which sleeves 21 that hold the fasteners 11 one by one are connected. The sleeve 21 is formed with an insertion hole 25 penetrating vertically. The inner peripheral surface of the insertion hole 25 is formed with an inner diameter along the shaft portion 13 of the fastener 11. For this reason, when the fastener 11 is inserted through the sleeve 21, the inner surface of the insertion hole 25 is brought into close contact with the shaft portion 13 of the fastener 11 so that the fastener 11 is firmly held.

The sleeves 21 holding the fasteners 11 one by one are connected to each other by a connection portion 28 so as to be able to be separated as illustrated in FIGS. 1A and 1B. As illustrated in FIG. 1A, the sleeves 21 are connected horizontally in a straight line shape with the height of the head portions 12 aligned. The connection portion 28 for connecting the sleeve 21 is designed to be broken when the fastener 11 is driven. When the connection portion 28 is broken, the sleeve 21 is cut from the connection band 20 and is driven into a driving target material 40 together with the fastener 11.

As illustrated in FIGS. 8A to 8E, the sleeve 21 according to the embodiment includes a head portion side holding portion 22 provided on the head portion 12 side of the fastener 11, a toe side holding portion 23 provided on the toe side of the fastener 11, and a constricted portion 24 provided between the head portion side holding portion 22 and the toe side holding portion 23.

Figure 8A:
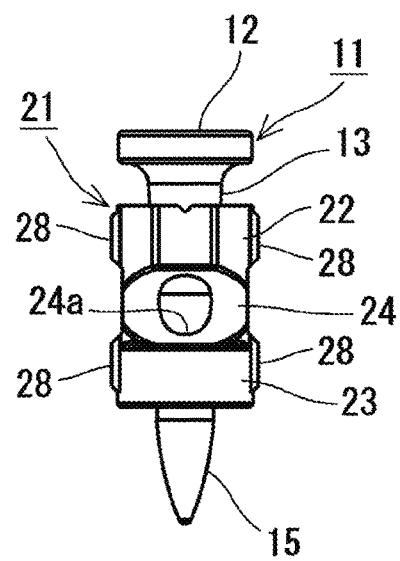
FIGS. 8A to 8E are views illustrating the shape of a sleeve, where
Figure 8C:
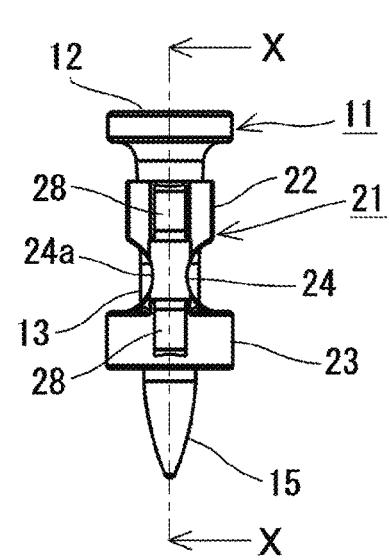
Figure 8D:
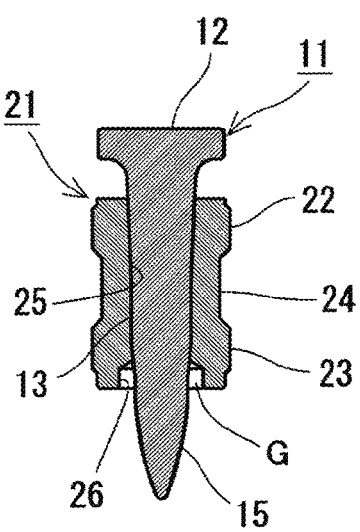
Figure 8B:
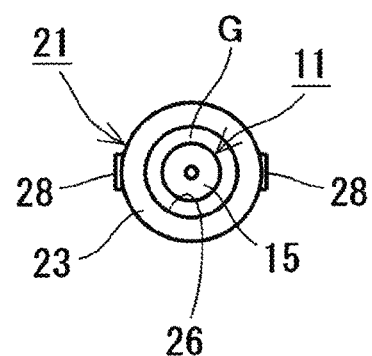
Figure 8E:
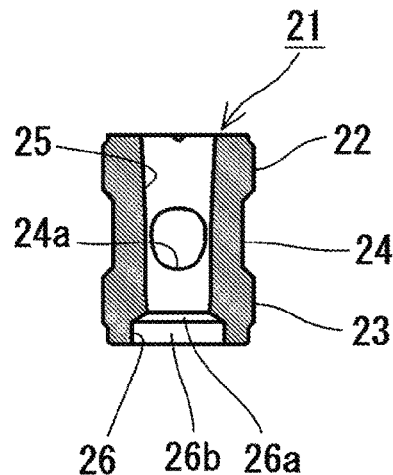
Figure 9A:
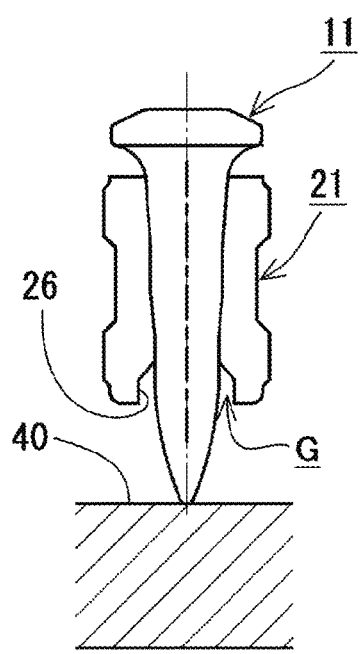
FIGS. 9A to 9F are views sequentially illustrating how the fastener penetrates into the driving target material.
Figure 9B:
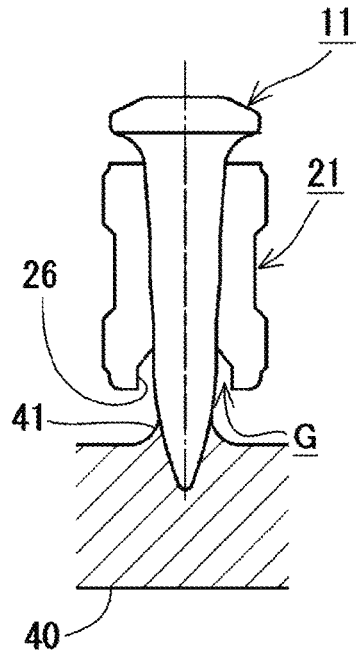
Figure 9C:
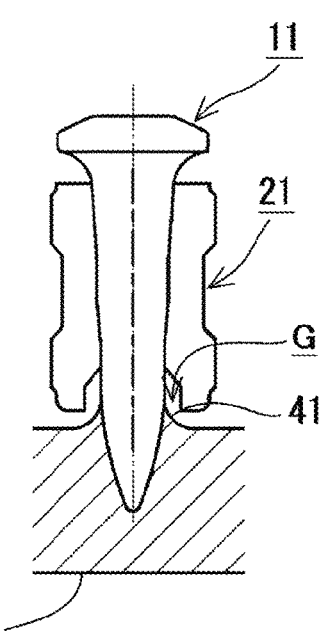
Figure 9D:
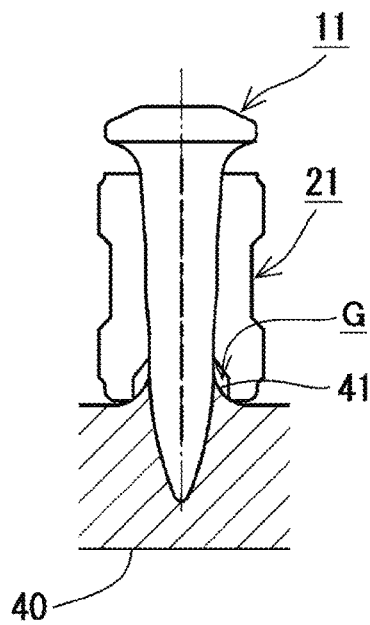
Figure 9E:
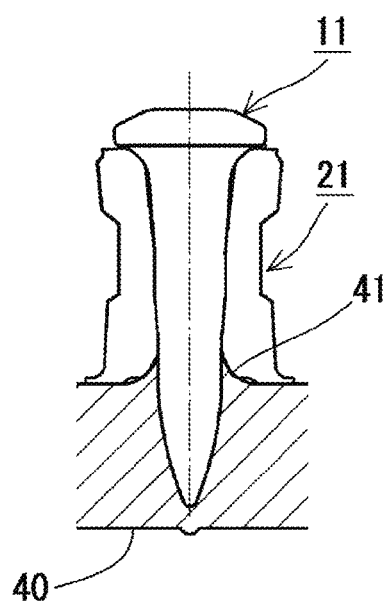
Figure 9F:
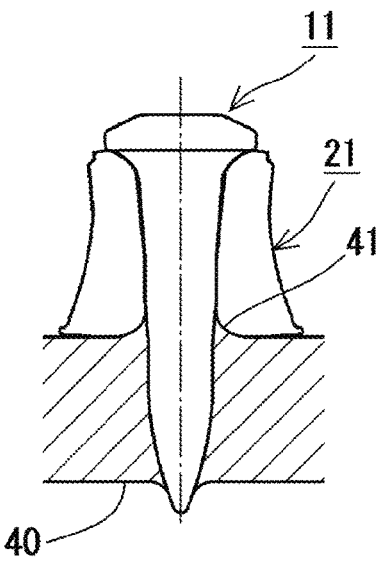

The toe side holding portion 23 according to the embodiment is formed so that the length of the outer periphery thereof is longer than that of the head portion side holding portion 22. Specifically, the outer periphery of the toe side holding portion 23 is formed in a circular shape having a diameter substantially equal to the inner diameter of an injection path 35a (described below). On the other hand, as illustrated in FIG. 8C, when the sleeve 21 is viewed from the front (direction in which the connection portion 28 faces the front), the outer periphery of the head portion side holding portion 22 is formed such that the lateral width of the head portion side holding portion 22 is smaller than the lateral width of the toe side holding portion 23. Thus, the head portion side holding portion 22 and the toe side holding portion 23 according to the embodiment are formed in different shapes and the sleeve 21 is formed asymmetrically in a vertical direction.

Further, the connection portions 28 described above are provided at two locations above and below corresponding to the head portion side holding portion 22 and the toe side holding portion 23, respectively. That is, the adjacent head portion side holding portions 22 are connected by the connection portion 28 and the adjacent toe side holding portions 23 are connected by the connection portion 28.

Further, the constricted portion 24 is formed so that the length of the outer circumference is shorter than that of the head portion side holding portion 22 and the toe side holding portion 23. Specifically, as illustrated in FIG. 8C, when the sleeve 21 is viewed from the front (the direction in which the connection portion 28 faces the front), an intermediate portion has a shape that is recessed inward so that the intermediate portion becomes the thinnest. The constricted portion 24 is formed with an opening 24a which exposes a side surface of the shaft portion 13 of the fastener 11. With such a shape, while the volume of the intermediate portion between the head portion side holding portion 22 and the toe side holding portion 23 is suppressed and the volume of the sleeve 21 is reduced, the shaft portion 13 of the fastener 11 can be held in a long upper and lower range.

Figure 2:
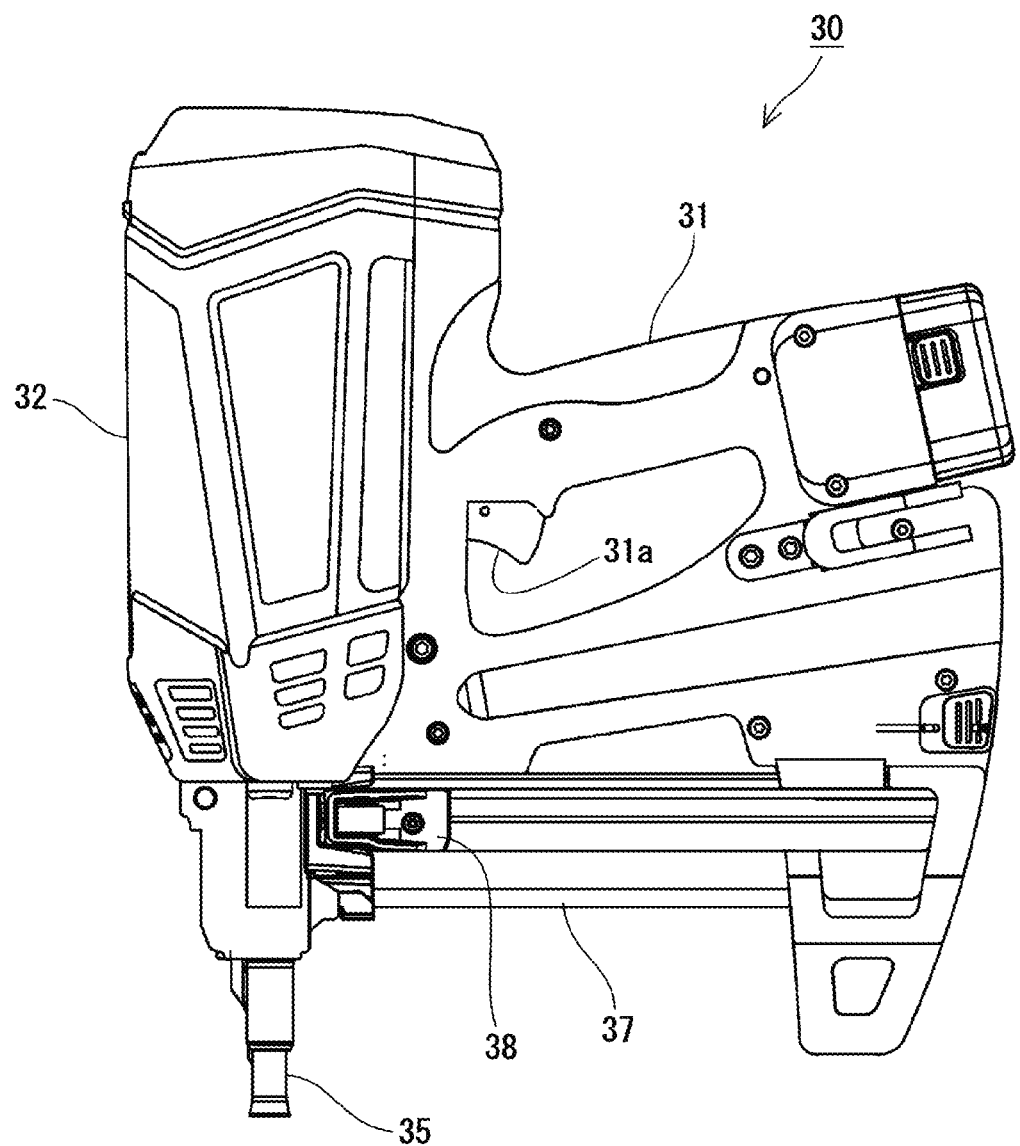
FIG. 2 is a side view of a driving tool.

The driving tool 30 which uses the connection fastener 10 may be anything as long as it ejects the fastener 11, but may be of any configuration as illustrated in FIG. 2, for example.

The driving tool 30 illustrated in FIG. 2 includes an output unit 32 which accommodates a drive mechanism 33 therein, and a grip 31 and a magazine 37 which are connected so as to be orthogonal to the output unit 32.

A nose portion 35 which is pressed against the driving target material 40 is provided at the tip of the output unit 32 and the leading fastener 11 loaded in the magazine 37 is supplied to the nose portion 35 by a pusher 38. The fastener 11 supplied to the nose portion 35 is ejected from an injection port provided at the tip of the nose portion 35 by a driver 34.

The nose portion 35 is provided so as to be slidable with respect to the housing and is always urged in a protruding direction by a spring. When an operator performs the driving operation, the nose portion 35 is pressed against the driving target material 40 and is slid. Thus, the operation of a trigger 31a described below becomes effective because the nose portion 35 is pushed. In other words, the driving operation is not performed when the nose portion 35 is not slid.

Figure 3:
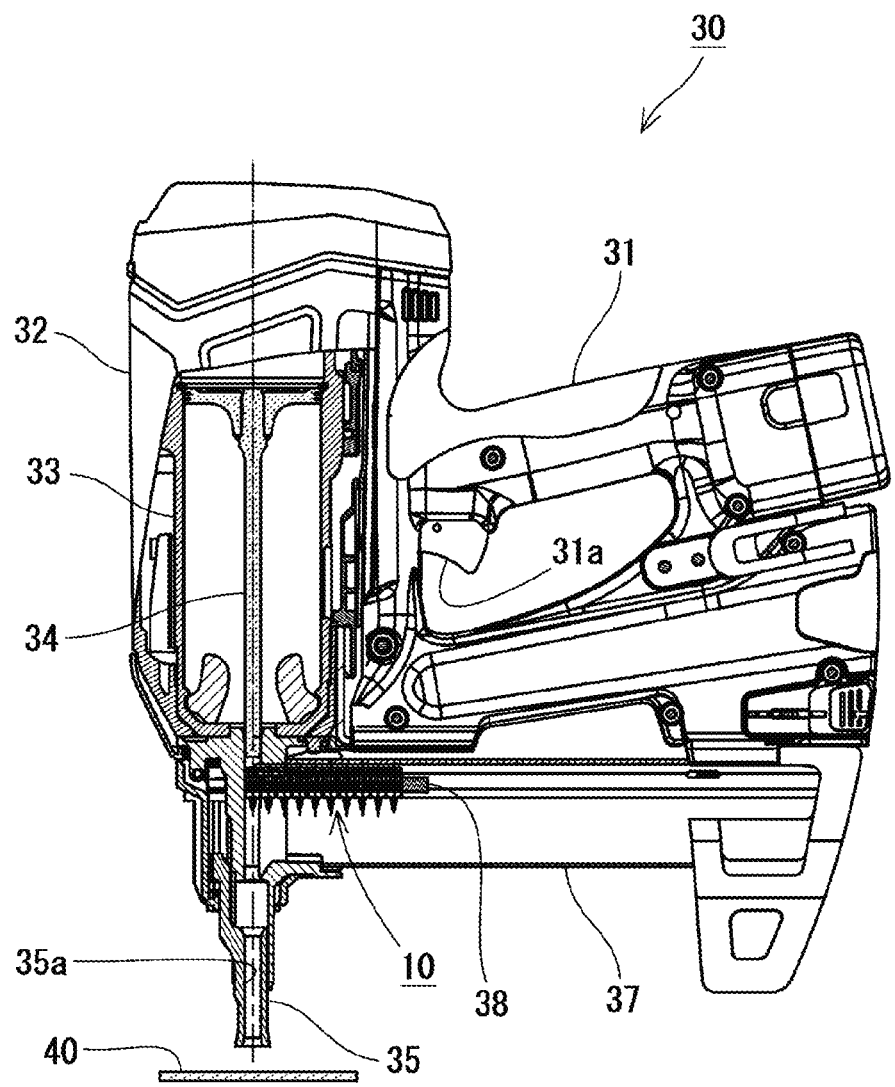
FIG. 3 is a side cross-sectional view of the driving tool, illustrating a state before driving.

As illustrated in FIG. 3, the injection path 35a for guiding the fastener 11 to the injection port is formed inside the nose portion 35. The leading fastener 11 of the connection fastener 10 passes through the injection path 35a and is ejected from the tip (injection port) of the injection path 35a.

Inside the output unit 32, the driver 34 capable of reciprocating in the injection path 35a in order to eject the fastener 11, the drive mechanism 33 for operating the driver 34, and the like are arranged. A known power source may be used for the drive mechanism 33. For example, the known drive mechanism 33 such as a spring drive type, a compressed air type, or a gas combustion type may be used.

The magazine 37 is used for loading the connection fastener 10. The magazine 37 is connected to the vicinity of the tip of the output unit 32. Inside the magazine 37 is provided with the pusher 38 for pressing the connection fastener 10 loaded in the magazine 37 in a direction of the injection path 35a. The pusher 38 is always biased forward by a spring and the connection fastener 10 loaded in the magazine 37 is always pressed forward by the pusher 38.

The grip 31 is a part for an operator who uses the driving tool 30 to grip. The grip 31 is formed in a rod shape so that an operator can easily grasp it. In addition, the trigger 31a which can be pulled with an index finger is provided at a position where the index finger of an operator is applied when the operator grips the grip 31. When the trigger 31a is operated, the trigger switch arranged inside the grip 31 is turned on and an operation signal is output to a control device. The control device activates the drive mechanism 33 using this operation signal as a trigger.

In a state before driving with the driving tool 30, as illustrated in FIG. 3, the connection fastener 10 is pressed forward by the pusher 38 and the leading fastener 11 of the connection fastener 10 waits directly under the driver 34. When the nose portion 35 is pressed against the driving target material 40 in the state described above, as illustrated in FIG. 4, driving can be performed.

Figure 4:
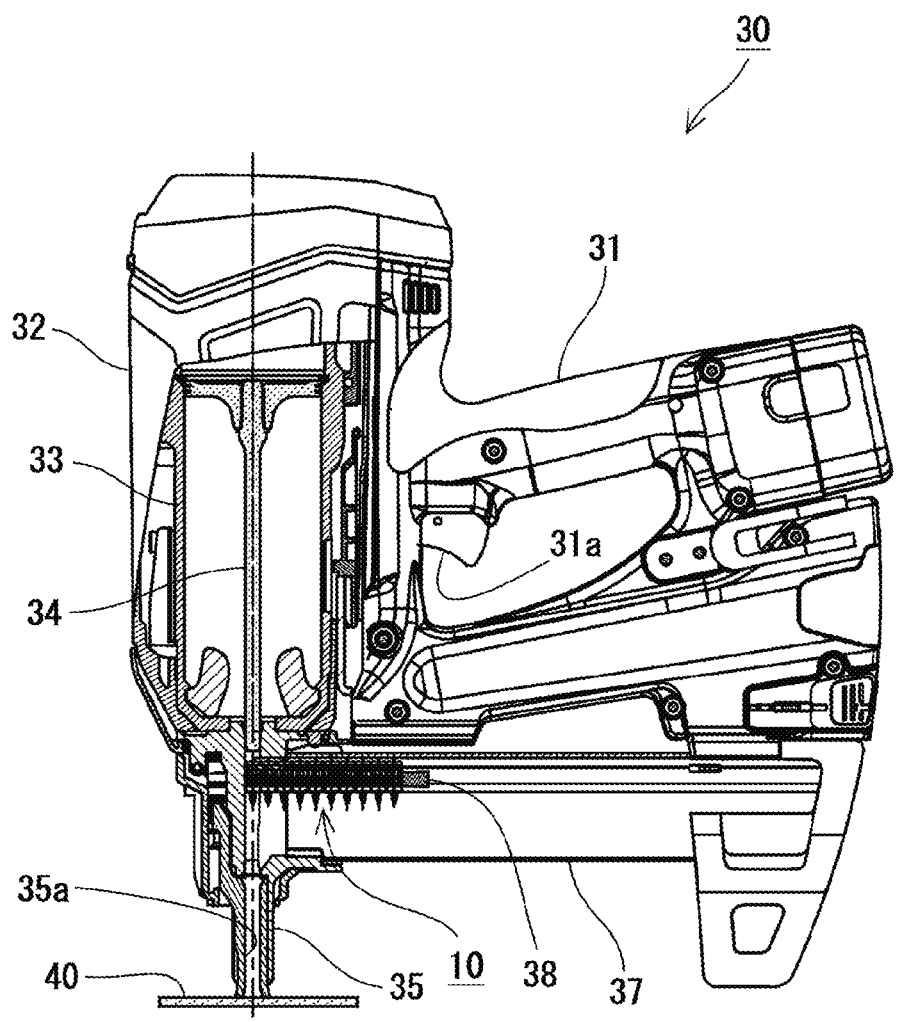
FIG. 4 is a side cross-sectional view of the driving tool, illustrating a state in which a nose portion is pressed against a driving target material.
Figure 5:
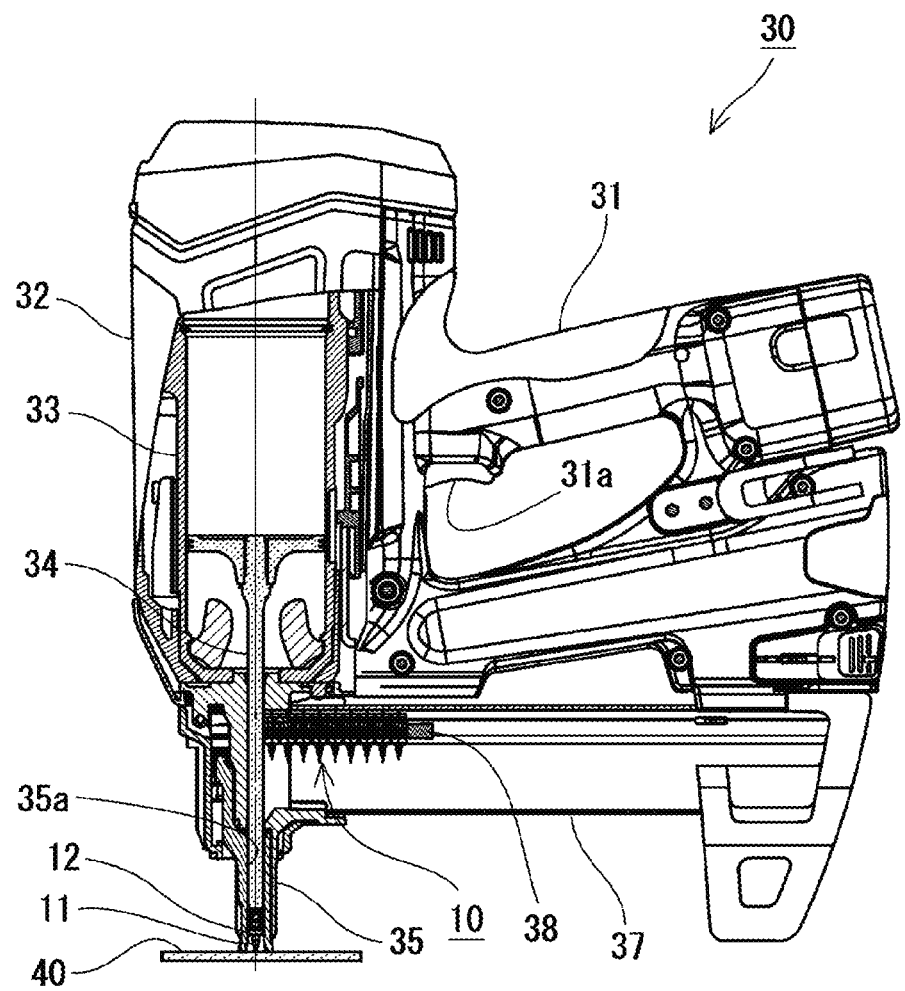
FIG. 5 is a side cross-sectional view of the driving tool, illustrating a state immediately before a punched fastener penetrates the driving target material.

When the trigger 31a is operated in the state of FIG. 4, the drive mechanism 33 is operated to drive out the driver 34 as illustrated in FIG. 5. The driver 34 hits the head portion 12 of the fastener 11 at the head of the connection fastener 10 and drives out the fastener 11 in the direction of the driving target material 40 through the injection path 35a. In this case, the sleeve 21 holding the leading fastener 11 is cut off from the connection fastener 10 and driven out in the direction of the driving target material 40 together with the leading fastener 11.

Figure 6:
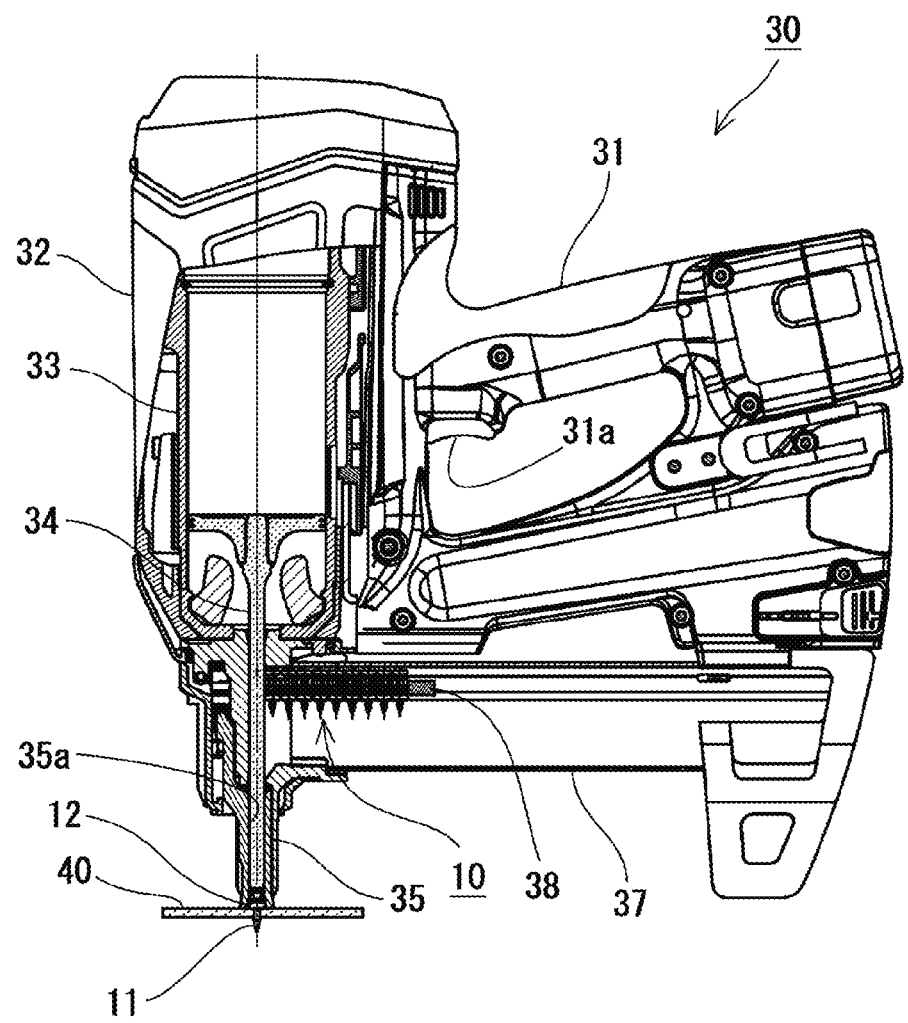
FIG. 6 is a side cross-sectional view of the driving tool, illustrating a state in the middle of the punched fastener penetrating into the driving target material.

When the driver 34 moves to near the bottom dead center, the fastener 11 penetrates into the driving target material 40 as illustrated in FIG. 6. In this case, the sleeve 21 holding the fastener 11 is crushed into a circular shape and is interposed between the head portion 12 of the fastener 11 and the driving target material 40. The sleeve 21 may be torn apart from the fastener 11 due to the pressure at the time of driving, but there is no problem even when the sleeve 21 is detached from the fastener 11.

Figure 7:
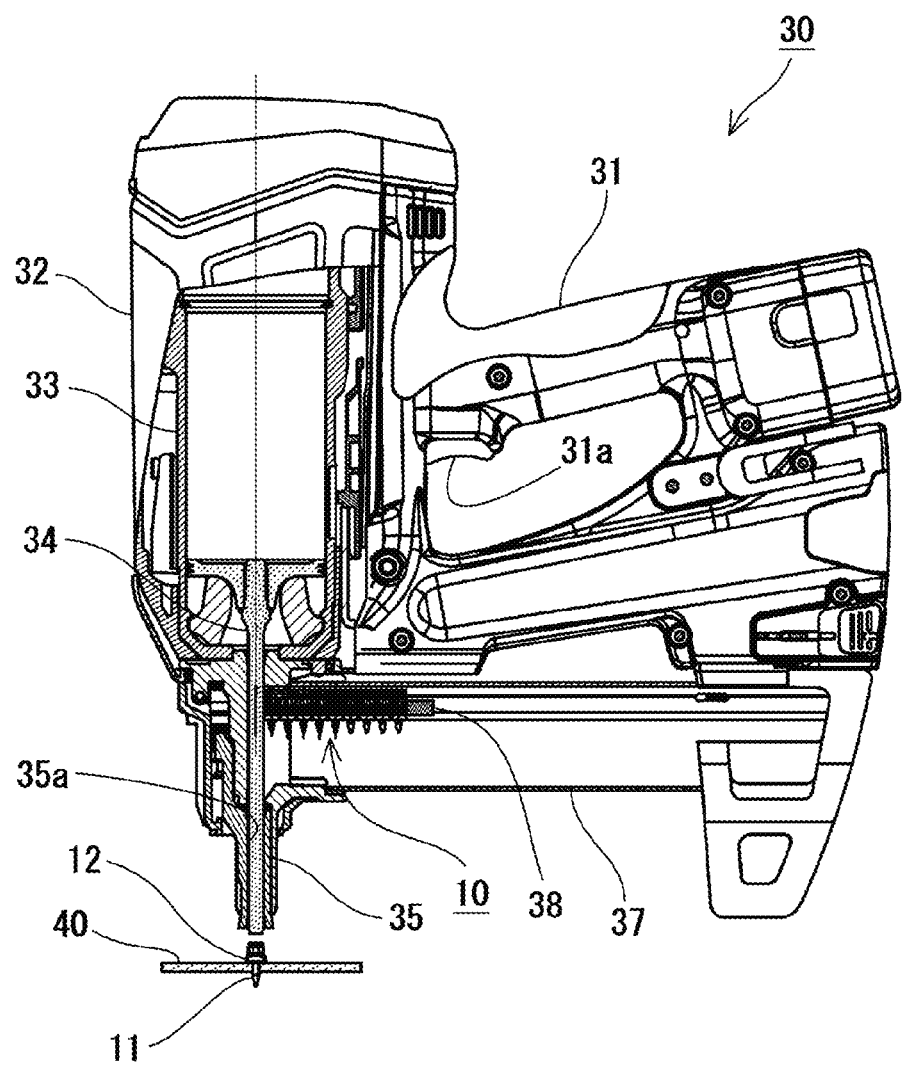
FIG. 7 is a side cross-sectional view of the driving tool, illustrating a state after the driving is completed.

When the driving of the fastener 11 is completed as described above, the fastener 11 and the sleeve 21 or only the fastener 11 is fixed to the driving target material 40 as illustrated in FIG. 7.

Here, in the inner peripheral surface of the sleeve 21 according to the embodiment, a recess portion 26 as illustrated in FIGS. 8A to 8E is formed. The recess portion 26 is formed in an opening edge of the toe side of the insertion hole 25 and the recess portion 26 is a groove recessed from the bottom surface (surface of the toe side) of the sleeve 21 in an axial direction of the fastener 11. Specifically, at the end portion on the toe side of the sleeve 21, the recess portion 26 of a cylindrical shape is formed so as to surround the fastener 11. By thus forming the recess portion 26, between the sleeve 21 and the fastener 11, a gap G is formed so as to face the toe side of the fastener 11.

The recess portion 26 according to the embodiment includes a tapered portion 26a and a large-diameter portion 26b which continues to the toe side of the tapered portion 26a. The tapered portion 26a has a frusto-conical inner peripheral surface and has a tapered shape which gradually expands as it extends toward the toe side. Moreover, the large-diameter portion 26b has a cylindrical inner peripheral surface and is formed with the same diameter as that of the toe side of the tapered portion 26a.

The recess portion 26 is used for forming a burring shape 41 in close contact with the fastener 11 when the fastener 11 is driven into the driving target material 40 such as a thin steel plate. That is, as illustrated in FIGS. 9A to 9F, when the fastener 11 penetrates into the driving target material 40 such as a thin steel plate, the burring shape 41 is formed around it. The burring shape 41 grows as the fastener 11 penetrates. When the fastener 11 penetrates to a certain extent, the sleeve 21 attached to the fastener 11 abuts on the driving target material 40. However, the gap G is formed by the recess portion 26 around the fastener 11, and thus the sleeve 21 does not hinder the formation of the burring shape 41. In other words, the burring shape 41 is formed in close contact with the fastener 11 by entering the gap G. For this reason, it is possible to improve the pulling-out strength of the driven fastener 11.

Figure 14A:
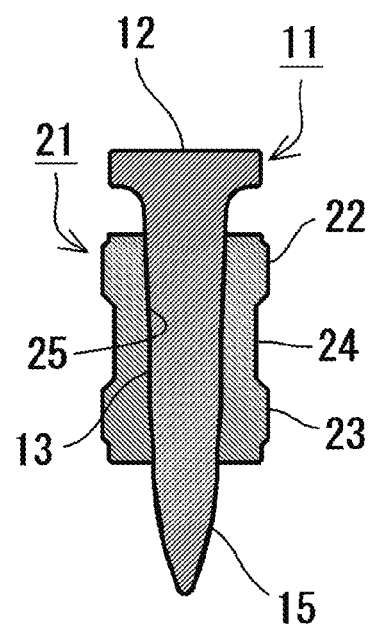
FIGS. 14A and 14B are views for explaining a connection fastener of the related art, where
Figure 14B:
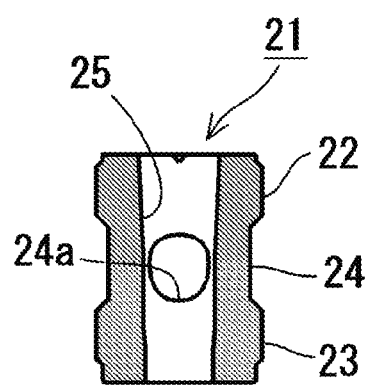
Figure 15A:
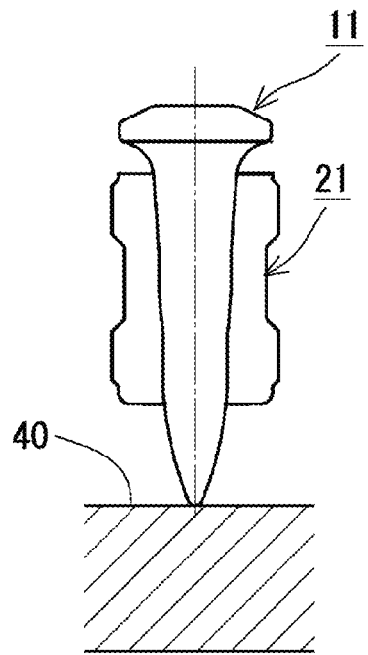
FIGS. 15A to 15F are views for explaining a connection fastener of the related art, where
Figure 15B:
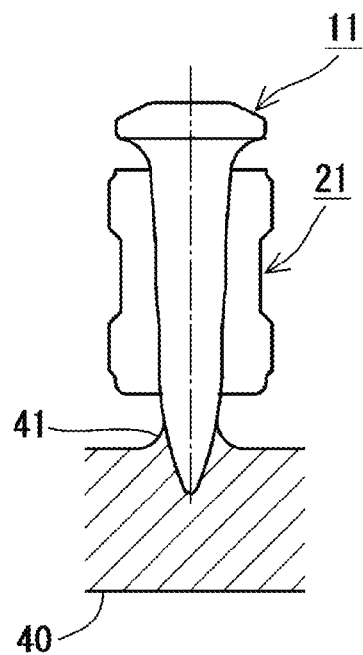
Figure 15C:
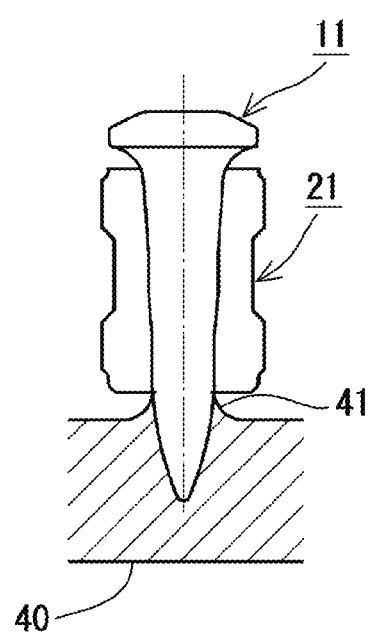
Figure 15D:
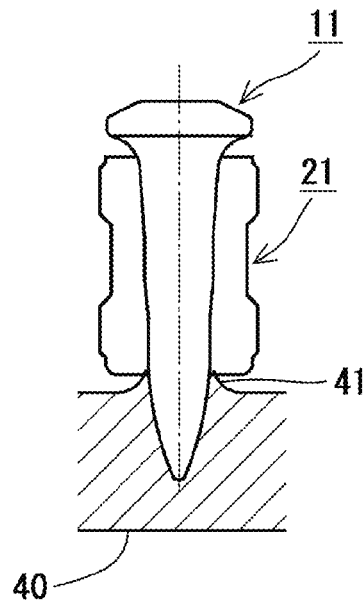
Figure 15E:
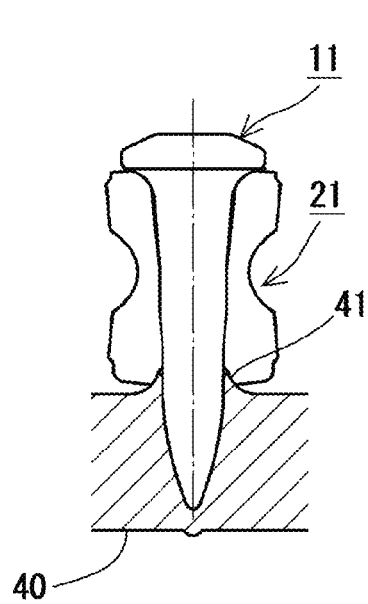
Figure 15F:
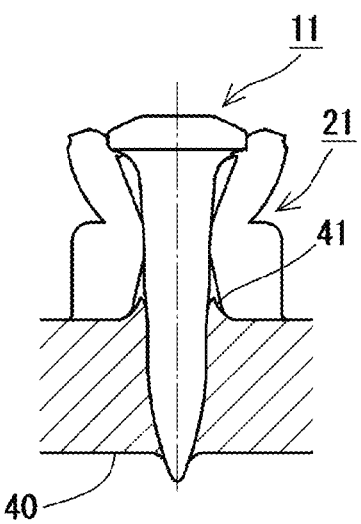

In the shape of the related art in which no gap G is formed between the sleeve 21 and the fastener 11 as illustrated in FIGS. 14A and 14B, when the sleeve 21 abuts on the driving target material 40 as illustrated in FIGS. 15A to 15F, the sleeve 21 presses the burring shape 41 from above. Therefore, the burring shape 41 is crushed or spread and formed without being in close contact with the fastener 11, and thus the pulling-out strength of the fastener 11 is reduced. When the connection fastener 10 according to the embodiment is used, it is possible to prevent such a reduction in the pulling-out strength.

In addition, the sleeve 21 according to the embodiment has the gap G formed only on the toe side and the inner peripheral surface of the end portion (head portion 12 side) opposite to the end portion where the gap G is formed is in close contact with the fastener 11. In this way, by forming the gap G only on the toe side, the inclination of the fastener 11 in the injection path 35*a* can be suppressed.

Figure 10A:
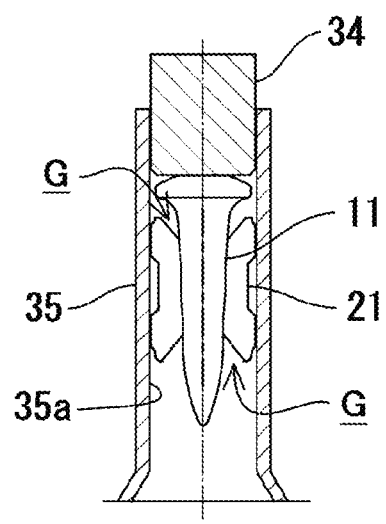
FIGS. 10A to 10F are views sequentially illustrating how the fastener moves in an injection path, where
Figure 10B:
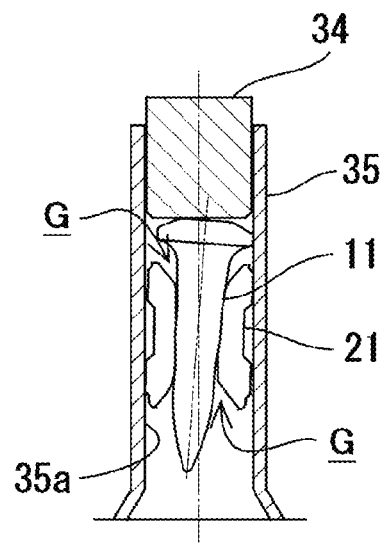
Figure 10C:
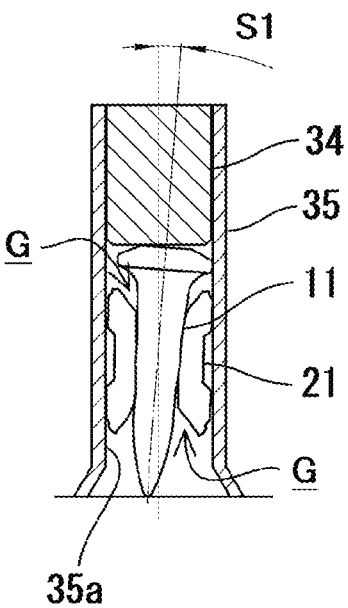

That is, as illustrated in FIGS. 10A to 10C, when the gap G is formed also on the head portion 12 side, the upper and lower ranges in which the shaft portion 13 of the fastener 11 can be held are narrowed, and thus the fastener 11 is easily inclined in the injection path 35*a*.

Figure 10D:
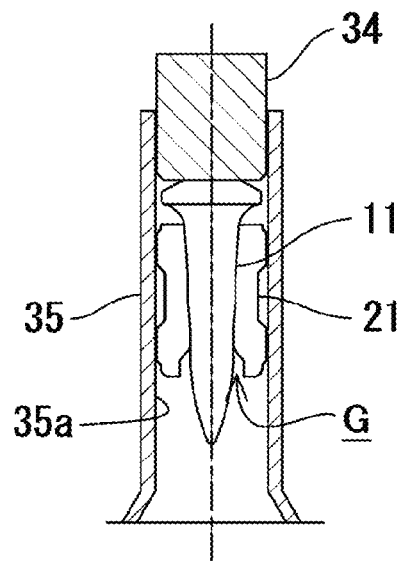
Figure 10E:
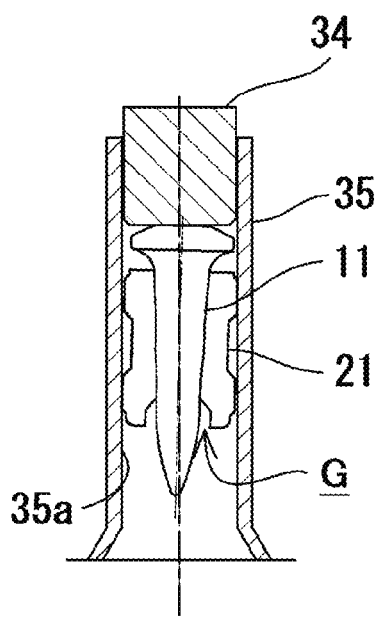
Figure 10F:
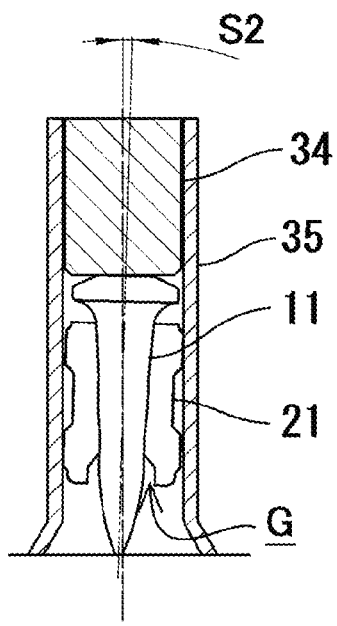

On the other hand, as illustrated in FIGS. 10D to 10F, when the gap G is not formed on the head portion 12 side, the upper and lower ranges in which the shaft portion 13 of the fastener 11 can be held become longer, and thus the inclination of the fastener 11 can be suppressed in the injection path 35*a*. That is, the amount of inclination S2 (see FIG. 10F) of the fastener 11 when the gap G is not formed on the head portion 12 side is smaller than the amount of inclination S1 (see FIG. 10C) of the fastener 11 when the gap G is formed on the head portion 12 side. Therefore, when no gap G is formed on the head portion 12 side, the fastener 11 can be driven straight out.

As described above, in this embodiment, the gap G is formed between the sleeve 21 and the fastener 11 so as to face the toe side of the fastener 11. According to such a configuration, when the fastener 11 is driven into a thin steel plate or the like, the burring shape 41 is formed so as to enter the gap G. Therefore, the growth of the burring shape 41 is not hindered. Therefore, since the burring shape 41 is formed in close contact with the fastener 11, the pulling-out strength of the driven fastener 11 does not decrease (in other words, the pulling-out strength of the fastener 11 is improved as compared with a case of the related art).

Moreover, since the shape (see FIGS. 14A and 14B) of the related art can be used as it is for the outer shape of sleeve 21, there is no effect on the function of stabilizing the posture of the fastener 11 in the injection path 35*a* or the magazine 37. Therefore, it is possible to improve only the pulling-out strength of the fastener 11 without deteriorating other functions of the connection band 20 and without changing the shapes of the magazine 37 and the injection path 35*a*.

The gap G is formed by forming the recess portion 26 on the inner peripheral surface of the sleeve 21. For this reason, when the fastener 11 is driven and the sleeve 21 is crushed, the toe side of the sleeve 21 is likely to spread outward, and thus the crushing load is reduced. By making the sleeve 21 easy to be crushed in this way, the impact at the time of driving is absorbed and deformation of the driving target material 40 such as a thin steel plate is suppressed. Therefore, the deformation of the burring shape 41 is suppressed, and thus the adhesion degree between the fastener 11 and the burring shape 41 can be increased.

The recess portion 26 is formed in a cylindrical shape so as to surround the periphery of the fastener 11. By configuring in this way, the sleeve 21 is easily crushed into a circular shape when the fastener 11 is driven. Since the sleeve 21 is crushed into a circular shape, the sleeve 21 serves as a washer, and thus the holding force by the fastener 11 can be increased.

In addition, the recess portion 26 has a tapered shape (tapered portion 26*a*) which gradually expands as it extends toward the toe side. By configuring in this way, when the fastener 11 is driven and the sleeve 21 is crushed, the toe side of the sleeve 21 is likely to spread outward, so that the ease of crushing the sleeve 21 is improved.

Further, in the sleeve 21, the inner peripheral surface of the end portion opposite to the end portion where the gap G is formed is in close contact with the fastener 11. With this configuration, the holding of the fastener 11 by the sleeve 21 can be further stabilized. In particular, the fastener 11 can be made difficult to be inclined in the injection path 35*a*.

Further, the sleeve 21 is formed asymmetric in the vertical direction. Therefore, since the loading direction when loading the connection fastener 10 into the magazine 37 is determined, it is possible to prevent the wrong mounting from being made upside down.

The shape of the recess portion 26 according to the embodiment described above is merely an example. Since the recess portion 26 may have various shapes, the recess portion 26 having a different shape may be provided instead of the recess portion 26 according to the embodiment described above.

Figure 11A:
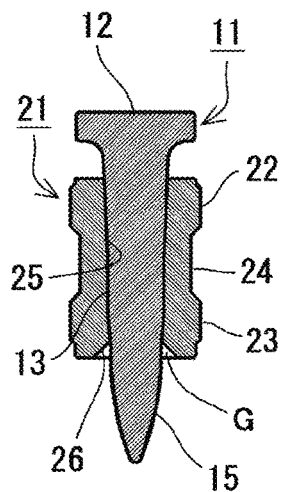
FIGS. 11A to 11H are views for explaining connection fasteners according to modification examples, where
Figure 11C:
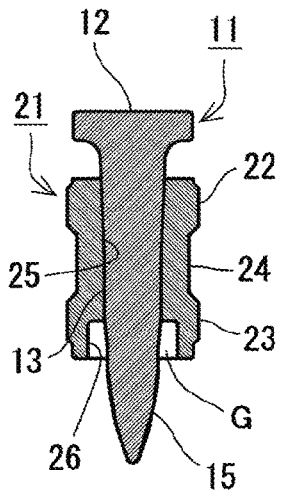
Figure 11E:
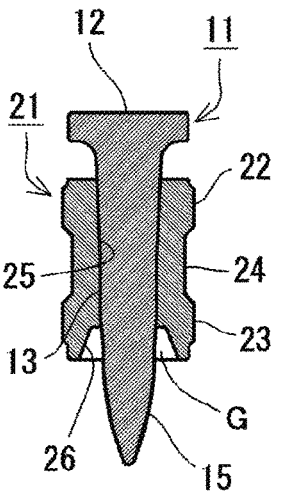
Figure 11G:
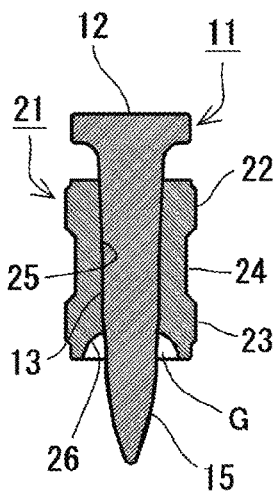
Figure 11B:
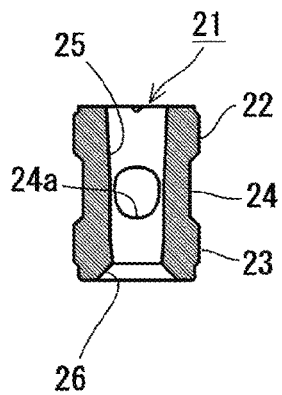

For example, as illustrated in FIGS. 11A and 11B, the recess portion 26 formed only with a tapered shape which gradually expands as it extends toward the toe side may be provided.

Figure 11D:
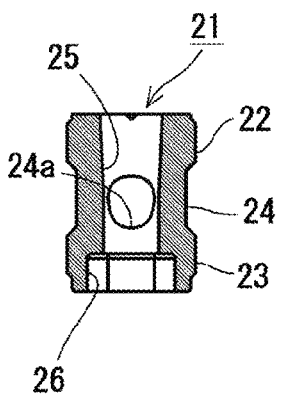

Further, as illustrated in FIGS. 11C and 11D, the recess portion 26 may be formed in the shape of a stepped hole continuous to the insertion hole 25 and the inner diameter of the recess portion 26 may be larger than the outer diameter of the fastener 11.

Figure 11F:
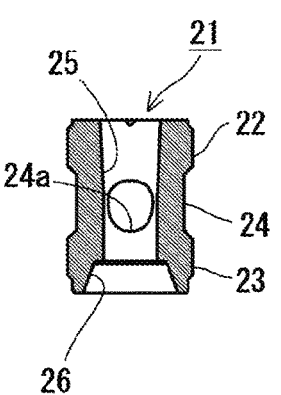

Also, as illustrated in FIGS. 11E and 11F, the recess portion 26 may be formed in a stepped hole shape continuous to the insertion hole 25 and the inner diameter of the recess portion 26 may be larger than the outer diameter of the fastener 11, and further the inner peripheral surface of the recess portion 26 may have a tapered shape which gradually expands as it extends toward the toe side.

Figure 11H:
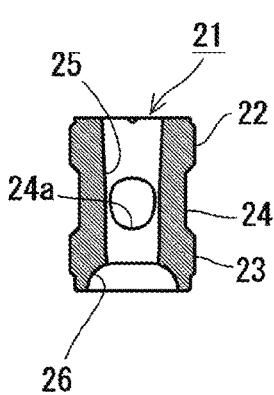

Further, as illustrated in FIGS. 11G and 11H, a bowl-shaped recess portion 26 which gradually bulges outward as it extends to the toe side may be provided.

Figure 12A:
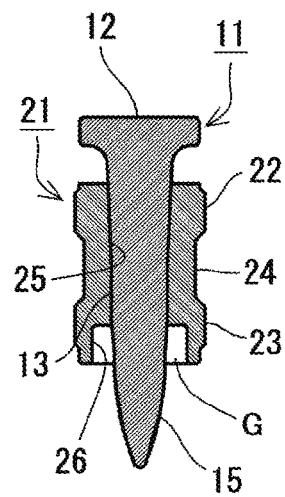
FIGS. 12A to 12L are views for explaining connection fasteners according to modification examples, where
Figure 12D:
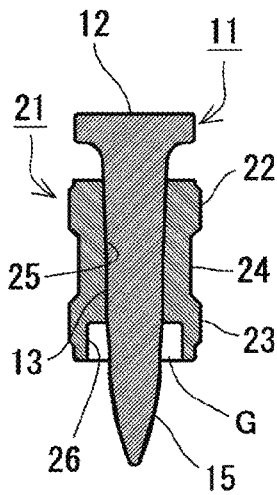
Figure 12G:
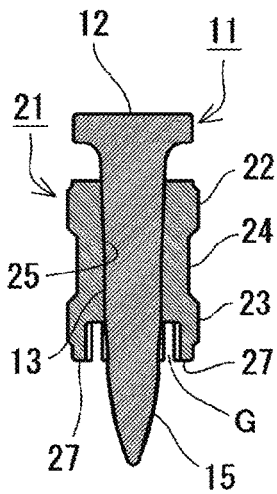
Figure 12J:
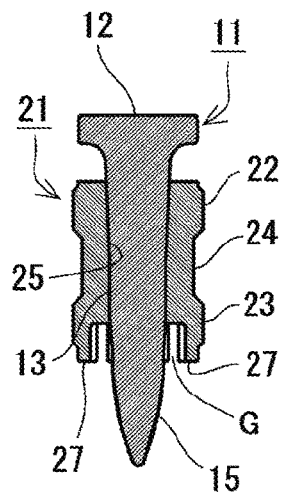
Figure 12B:
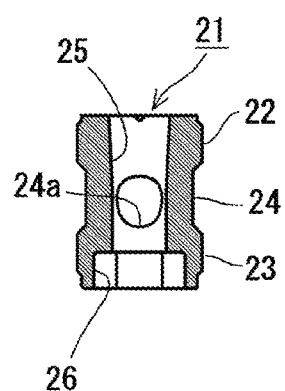
Figure 12E:
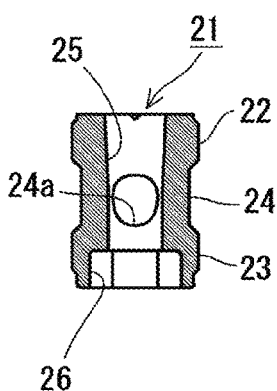
Figure 12H:
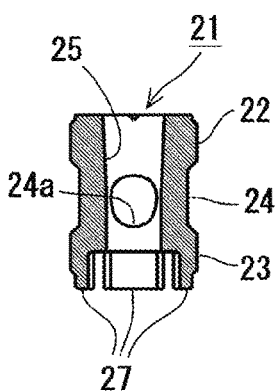
Figure 12K:
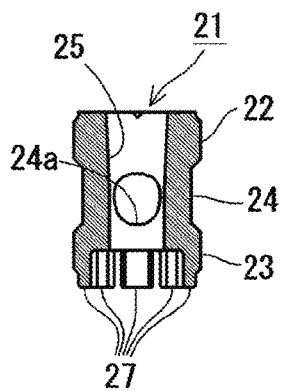
Figure 12C:
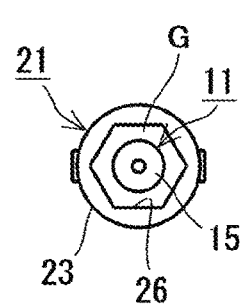
Figure 12F:
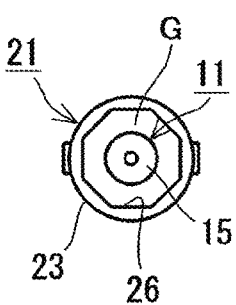

Further, the recess portion 26 having a polygonal shape instead of a circular cross section may be provided. For example, as illustrated in FIGS. 12A, 12B, and 12C, the recess portion 26 having a hexagonal cross section may be provided, or as illustrated in FIGS. 12D, 12E, and 12F, the recess portion 26 having an octagonal cross section may be provided.

Figure 12I:
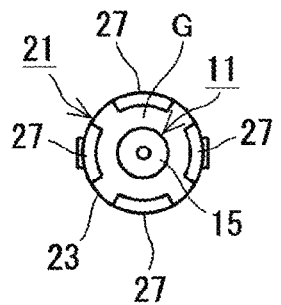
Figure 12L:
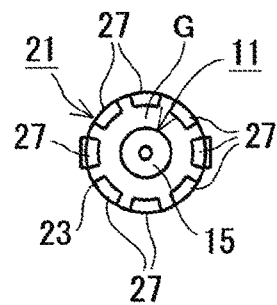

Further, instead of providing the recess portion 26, a plurality of leg portions 27 protruding toward the toe side of the fastener 11 may be provided on the sleeve 21, thereby forming the gap G. For example, as illustrated in FIGS. 12G, 12H, and 12I, the four leg portions 27 may be provided so as to surround the periphery of the fastener 11 and the gap G may be formed between the leg portions 27 and the fastener 11. As illustrated in FIGS. 12J, 12K, and 12I, the eight leg portions 27 may be provided so as to surround the periphery of the fastener 11 and the gap G may be formed between the leg portions 27 and the fastener 11. When the plurality of leg portions 27 are provided in this way, the leg portions 27 are more easily deformed than the cylindrical sleeve 21, so that the deformation at the time of driving can be stabilized and the load at the time of driving can be reduced.

The arrangement and shape of the leg portions 27 are not limited to the above example and can be changed as appropriate. For example, the shapes of the plurality of leg portions 27 may not be the same and the leg portions 27 having different shapes may be provided in combination. Moreover, the load (deformation load of the sleeve 21) at the time of driving may be reduced by setting the interval of the adjacent leg portions 27 wide. However, it is preferable to arrange the intervals of the leg portions 27 as evenly as possible. By making the intervals of the leg portions 27 evenly, the leg portions 27 are easily evenly crushed at the time of driving, so that an effect as a washer can be easily obtained after driving. The number of the leg portions 27 can also be freely changed. However, in order to sufficiently obtain the effect of maintaining the vertical posture of the fastener 11, it is preferable to provide three or more leg portions 27 around the periphery.

Figure 13A:
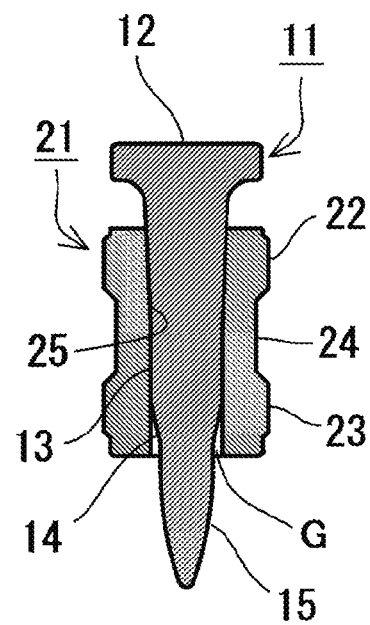
FIGS. 13A and 13B are views for explaining a connection fastener according to a modification example, where
Figure 13B:
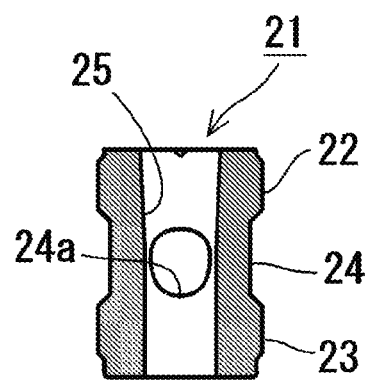

Further, instead of providing the recess portion 26, the diameter of the fastener 11 may be changed to thereby form the gap G. For example, as illustrated in FIGS. 13A and 13B, a reduced diameter portion 14 may be provided in a portion of the fastener 11 where the sleeve 21 is attached and the gap G may be formed between the reduced diameter portion 14 and the sleeve 21. In addition, the fastener 11 provided with such the reduced diameter portion 14 and the sleeve 21 formed with the recess portion 26 may be combined to form the gap G.

The invention claimed is:

1. A connection fastener in which a plurality of fasteners for a driving tool are connected, comprising:
   a connection band which detachably connects sleeves holding the fasteners one by one, wherein
   a gap is formed between the sleeve and the fastener so as to face a toe side of the fastener by forming a recess portion on an inner peripheral surface of the sleeve,
   in the sleeve, an inner peripheral surface of an end portion opposite to an end portion where the gap is formed is in close contact with the fastener, and
   an inner diameter of the recess portion at the toe side of the fastener is larger than the inner diameter of the sleeve at an intermediate portion.

2. The connection fastener according to claim 1, wherein the recess portion is formed in a cylindrical shape so as to surround a periphery of the fastener.

3. The connection fastener according to claim 1, wherein the recess portion has a tapered shape which gradually expands as it extends toward the toe side.

4. The connection fastener according to claim 1, wherein the sleeve is formed asymmetrically in a vertical direction.

5. A fastener and sleeve comprising:
   a fastener for a driving tool; and
   a sleeve holding the fastener, wherein
   a gap is formed between the sleeve and the fastener so as to face a toe side of the fastener by forming a recess portion on an inner peripheral surface of the sleeve,
   in the sleeve, an inner peripheral surface of an end portion opposite to an end portion where the gap is formed is in close contact with the fastener, and
   an inner diameter of the recess portion at the toe side of the fastener is larger than the inner diameter of the sleeve at an intermediate portion.

6. The fastener and sleeve according to claim 5, wherein the sleeve includes:
   a head portion side holding portion provided on a head portion side of the fastener;
   a toe side holding portion provided on the toe side of the fastener; and
   a constricted portion provided between the head portion side holding portion and the toe side holding portion.

7. The fastener and sleeve according to claim 6, wherein the toe side holding portion is formed so that the length of the outer periphery of the toe side holding portion is longer than that of the head portion side holding portion.

8. The fastener and sleeve according to claim 6, wherein when the sleeve is viewed from the front, the outer periphery of the head portion side holding portion is formed such that the lateral width of the head portion side holding portion is smaller than the lateral width of the toe side holding portion.

9. The fastener and sleeve according to claim 6, wherein the head portion side holding portion and the toe side holding portion have different shapes and the sleeve is formed asymmetrically in a vertical direction.

10. The fastener and sleeve according to claim 6, wherein when the sleeve is viewed from the front, an intermediate portion has a shape that is recessed inward so that the sleeve has a thickness which is smallest at the intermediate portion.

11. The fastener and sleeve according to claim 6, wherein the constricted portion includes an opening which exposes a side surface of the shaft portion of the fastener.

* * * * *